No. 743,380. Patented November 3, 1903.

UNITED STATES PATENT OFFICE.

WILLIAM B. FITZPATRICK, OF PITTSBURG, PENNSYLVANIA, ASSIGNOR OF ONE-HALF TO EUGENE MEYER, OF SPRING GARDEN BOROUGH, ALLEGHENY COUNTY, PENNSYLVANIA.

COMPOUND FOR THE REMOVAL AND PREVENTION OF INCRUSTATION IN STEAM-BOILERS.

SPECIFICATION forming part of Letters Patent No. 743,380, dated November 3, 1903.

Application filed August 7, 1903. Serial No. 168,618. (No specimens.)

*To all whom it may concern:*

Be it known that I, WILLIAM B. FITZPATRICK, a citizen of the United States, residing at Pittsburg, in the county of Allegheny and State of Pennsylvania, have invented or discovered a new and useful Improvement in Compounds for the Removal and Prevention of Incrustation in Steam-Boilers, of which the following is a description.

My composition consists of the following ingredients combined in substantially the proportions hereinafter specified, viz.: caustic soda, forty (40) pounds; extract of logwood, twelve (12) pounds; powdered ivory-black, four (4) pounds; sulfate of zinc, four (4) pounds; black oxid of manganese, four (4) pounds; water, about fifty-two (52) gallons. These ingredients are thoroughly mixed or mingled, the logwood being preferably dissolved in water and after being dissolved all the water heretofore specified added thereto. The other ingredients being thoroughly mixed are then added, producing a liquid compound in which all the ingredients are held in suspension. This is the preferable manner of using my compound; but the compound properly mixed may be used as a powder and fairly good results obtained.

In using this liquid compound to remove scale from steam-boilers I have ascertained that ten gallons charged into the boiler of, say, from four hundred to six hundred cubic feet by means of an injector or pump three times per day will remove the heaviest incrustation or scale, and after the removal of the scale two gallons per day will prevent any further formation of scale and keep the boiler clean and entirely free therefrom. Two gallons per day will also be sufficient to remove a light formation of scale. I have also discovered that the acids that may be contained in the water are neutralized and foaming prevented.

I claim as my invention or discovery and desire to secure by Letters Patent—

1. A compound for removing incrustation or scale from steam-boilers and preventing the formation thereof, composed of caustic soda, extract of logwood, powdered ivory-black, sulfate of zinc, and black oxid of manganese in substantially the proportions specified.

2. A compound for removing incrustation or scale from steam-boilers and preventing the formation thereof, composed of caustic soda, extract of logwood, powdered ivory-black, sulfate of zinc, and black oxid of manganese mixed and held in suspension in water, in substantially the proportions specified.

3. A compound for removing incrustation or scale from steam-boilers, and preventing the formation thereof, composed of caustic soda forty pounds, extract of logwood twelve pounds, powdered ivory-black four pounds, sulfate of zinc four pounds, black oxid of manganese four pounds, water fifty-two gallons.

4. A compound for removing incrustation or scale from steam-boilers and preventing the formation thereof, composed of caustic soda forty pounds, extract of logwood twelve pounds, powdered ivory-black four pounds, sulfate of zinc four pounds, black oxid of manganese four pounds.

In testimony whereof I have hereunto signed my name in the presence of two subscribing witnesses.

WILLIAM B. FITZPATRICK.

In presence of—
CLARENCE A. WILLIAMS,
JOHN H. RONEY.